US011944123B2

(12) United States Patent
Oh

(10) Patent No.: US 11,944,123 B2
(45) Date of Patent: Apr. 2, 2024

(54) HEAT GENERATING HEATER FOR CIGARETTE-TYPE ELECTRONIC CIGARETTE DEVICE

(71) Applicant: AMOSENSE CO., LTD, Cheonan-si (KR)

(72) Inventor: Chang Woo Oh, Anseong-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 775 days.

(21) Appl. No.: 16/981,063

(22) PCT Filed: Apr. 9, 2019

(86) PCT No.: PCT/KR2019/004181
§ 371 (c)(1),
(2) Date: Sep. 15, 2020

(87) PCT Pub. No.: WO2019/199010
PCT Pub. Date: Oct. 17, 2019

(65) Prior Publication Data

US 2021/0045447 A1 Feb. 18, 2021

(30) Foreign Application Priority Data

Apr. 9, 2018 (KR) ........................ 10-2018-0041003
Apr. 8, 2019 (KR) ........................ 10-2019-0040840

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/51* (2020.01); *H05B 1/0213* (2013.01); *H05B 3/06* (2013.01); *H05B 3/48* (2013.01)

(58) Field of Classification Search
CPC .......... A24F 40/46; A24F 40/20; A24F 40/51; A24F 40/53; A24F 40/57; H05B 1/0213
(Continued)

(56) References Cited

U.S. PATENT DOCUMENTS 10,750,785 B2 * 8/2020 Hogwood ............. A61M 15/06
11,589,428 B2 * 2/2023 Li ........................... A24F 40/44
(Continued)

FOREIGN PATENT DOCUMENTS

CN 204273238 4/2015
CN 104799438 7/2015
(Continued)

OTHER PUBLICATIONS

International Search Report—PCT/KR2019/004181 dated Jul. 12, 2019.
(Continued)

*Primary Examiner* — Alexander Gilman
(74) *Attorney, Agent, or Firm* — CANTOR COLBURN LLP

(57) ABSTRACT

Provided is a heat generating heater for a cigarette-type electronic cigarette device. A heat generating heater for a cigarette-type electronic cigarette device is configured by at least a portion of the length being inserted into a cigarette and comprises: a main body which is made of a ceramic material and has an end portion pointed for penetration into the cigarette; a heat generating unit which is disposed to surround the circumferential surface of the main body to generate heat for heating the inside of the cigarette; an arrangement hole which is formed in the main body along the longitudinal direction thereof; and a temperature sensing unit which is disposed in the arrangement hole for measuring a heating temperature of the heat generating unit.

5 Claims, 5 Drawing Sheets

(51) Int. Cl.

| | |
|---|---|
| ***A24F 40/51*** | (2020.01) |
| ***H05B 1/02*** | (2006.01) |
| ***H05B 3/06*** | (2006.01) |
| ***H05B 3/48*** | (2006.01) |

(58) Field of Classification Search
USPC .......................................................... 131/329
See application file for complete search history.

(56) References Cited

U.S. PATENT DOCUMENTS

| | | | | |
|---|---|---|---|---|
| 2016/0081395 | A1* | 3/2016 | Thorens | A61M 11/042<br>392/390 |
| 2017/0001854 | A1* | 1/2017 | Li | B65B 39/003 |
| 2017/0105454 | A1* | 4/2017 | Li | A24F 40/44 |
| 2017/0119046 | A1* | 5/2017 | Kaufman | H05B 6/105 |
| 2017/0280779 | A1* | 10/2017 | Qiu | G05D 23/1919 |
| 2017/0325510 | A1* | 11/2017 | Hu | A24F 40/50 |
| 2017/0340017 | A1* | 11/2017 | Thorens | A24F 40/40 |
| 2017/0347706 | A1* | 12/2017 | Aoun | A24F 40/42 |
| 2017/0347711 | A1* | 12/2017 | Litten | A24F 40/485 |
| 2017/0347714 | A1* | 12/2017 | Metz | H05B 3/48 |
| 2017/0360092 | A1* | 12/2017 | Althorpe | A61M 15/06 |
| 2017/0367407 | A1* | 12/2017 | Althorpe | A24F 40/40 |
| 2017/0367410 | A1* | 12/2017 | Hon | H05B 1/0297 |
| 2019/0223504 | A1* | 7/2019 | Chen | A24F 40/485 |

FOREIGN PATENT DOCUMENTS

| | | |
|---|---|---|
| JP | H10214675 | 8/1998 |
| JP | 2016085864 | 5/2016 |
| JP | 2017163975 | 9/2017 |
| JP | 2018505696 | 3/2018 |
| KR | 101667124 | 10/2016 |
| KR | 20170036338 | 4/2017 |
| KR | 20170110590 | 10/2017 |
| KR | 20170130396 | 11/2017 |

OTHER PUBLICATIONS

Chinese Office Action—Chinese Application No. 201980019975.X dated Feb. 3, 2023, citing CN 104799438, CN 107427078, and CN 204273238.

* cited by examiner

HEAT GENERATING HEATER FOR CIGARETTE-TYPE ELECTRONIC CIGARETTE DEVICE

TECHNICAL FIELD

The present invention relates to a heat generating heater for an electronic cigarette device, and more specifically, to a heat generating heater for a cigarette-type electronic cigarette device.

BACKGROUND ART

An electronic cigarette device includes a storage, a heating or vaporizing device, and a battery. In this case, the storage contains a processed material or extract of leaf tobacco containing nicotine, a nicotine-free liquid material, and the like.

The above-described electronic cigarette device generates an aerosol by heating or vaporizing the leaf tobacco processed material, the leaf tobacco extract, or the nicotine-free liquid material which are stored therein. Accordingly, a user can inhale the aerosol generated from an inside of the electronic cigarette device through an intake of the electronic cigarette device while holding the electronic cigarette device in his or her hand. Accordingly, the user can feel a similar feeling to smoking a real cigarette through the inhaled aerosol.

However, the conventional electronic cigarette device adopts a liquid type manner in which a nicotine undiluted solution and a liquid are separately purchased and mixed. Accordingly, in the conventional electronic cigarette device, there is a risk in that a user misuses the nicotine undiluted solution for other improper purposes, such as an explosion accident and the like instead of smoking.

To this end, a cigarette-type electronic cigarette device in a fumigation method, in which a cigarette made of tobacco leaves is inserted and heated, has been proposed. Since the cigarette-type electronic cigarette device adopts a manner of generating smoking vapor by heating the cigarette through a heat generating heater, there is an advantage in that a taste similar to that of conventional cigarettes can be felt while solving a problem of misuse of the liquid nicotine undiluted solution.

However, in the conventional cigarette-type electronic cigarette device, a heating temperature of the heat generating heater is controlled using a thin film type temperature sensor disposed on a circumferential surface of the heat generating heater. Since the thin film type temperature sensor senses a temperature based on a resistance value, in order to measure an accurate temperature, it is difficult to accurately design a sensor pattern according to the temperature to be controlled.

Accordingly, in a case in which the sensor pattern is not accurately designed, a cigarette-type electronic cigarette device of a thin film type temperature sensor type has a problem in that the temperature of the heat generating heater cannot be uniformly controlled.

DISCLOSURE

Technical Problem

The present invention is directed to providing a heat generating heater for a cigarette-type electronic cigarette device allowing a uniform temperature to be realized by measuring a heating temperature of a heat generating heater through a temperature sensing unit embedded in the heat generating heater.

Technical Solution

One aspect of the present invention provides a heat generating heater for a cigarette-type electronic cigarette device having at least a portion of a length thereof inserted into a cigarette and including: a main body formed of a ceramic material and having one end portion that is pointed so as to penetrate into the cigarette; a heat generating unit disposed to surround a circumferential surface of the main body to generate heat so that the inside of the cigarette is heated; an arrangement hole formed inside the main body along a longitudinal direction thereof; and a temperature sensing unit disposed in the arrangement hole to measure a heating temperature of the heat generating unit.

Further, the main body may include a hollow-shaped rod portion in which the arrangement hole is formed and a tip portion sharply formed at one end portion of the rod portion, and the heat generating unit may be disposed to surround the rod portion in a circumferential direction of the rod portion.

For example, the temperature sensing unit may be a thermocouple.

Alternatively, the temperature sensing unit may be a spiral bimetal. In this case, the spiral bimetal may include a stem portion having a predetermined length, a wound portion wound many times along a longitudinal direction of the stem portion from an end portion of the stem portion, and an extending portion extending from an end portion of the wound portion to protrude to the outside of the arrangement hole by a predetermined length, and the extending portion may come into contact with or not come into contact with a contact terminal formed in an outer surface of the heat generating heater for a cigarette-type electronic cigarette device by being bent in one direction or return to an original according to a temperature of the heat generating unit.

Further, the heat generating heater may further include a filling material having thermal conductivity and filled in the arrangement hole, and the filling material may fix a position of the temperature sensing unit inserted into the arrangement hole.

In addition, the heat generating unit may include a support formed of a ceramic material, a heater pattern patterned in one surface of the support so that heat is generated to heat the inside of the cigarette, and a cover layer which has an insulating property and covers the heater pattern.

In addition, the support of the heat generating unit may be sintered after rolling to surround the circumferential surface of the main body in a ceramic green sheet state.

Meanwhile, another aspect of the present invention provides a heat generating heater for a cigarette-type electronic cigarette device having at least a portion of a length thereof inserted into a cigarette and including: a heat generating unit having one end portion formed in a pointed plate shape so as to penetrate into the cigarette and including a heater pattern configured to generate heat to heat the inside of the cigarette; an arrangement hole formed inside the heat generating unit along a longitudinal direction; and a temperature sensing unit disposed in the arrangement hole to measure a heating temperature of the heat generating unit.

In this case, the heat generating unit may include a support formed of a ceramic material, a heater pattern patterned in one surface of the support so that heat is generated to heat the inside of the cigarette, a cover layer which has an insulating property and covers the heater pattern, and a heat dissipation coating layer including a heat dissipating filler formed in an outer exposed surface to improve deviation in temperature between a direct upper region and other regions of the heater pattern, and the arrangement hole may be formed in the support.

Meanwhile, the above-described heat generating heater for a cigarette-type electronic cigarette device may be implemented as a cigarette-type electronic cigarette device.

Advantageous Effects

According to the present invention, a uniform heating temperature can be realized by measuring a heating temperature of a heat generating heater through a temperature sensing unit embedded in the heat generating heater along a longitudinal direction.

MODES OF THE INVENTION

Figure 1:
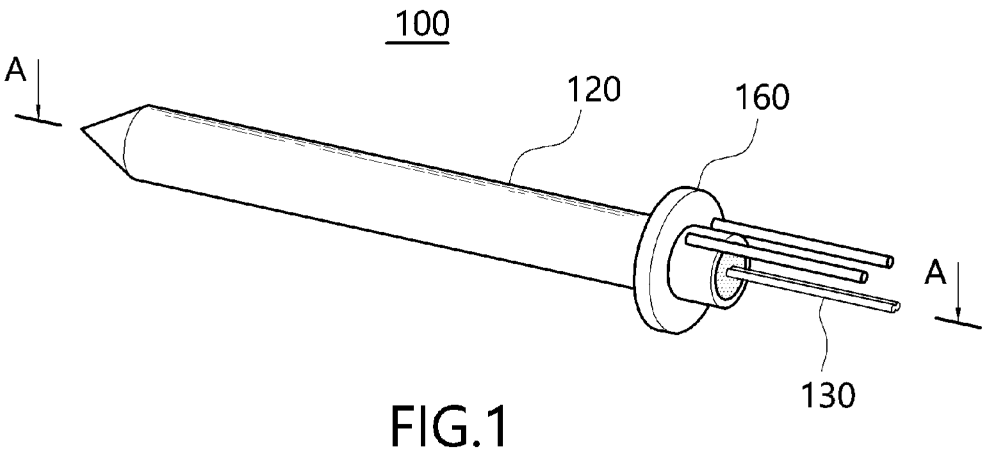
FIG. 1 is a view illustrating a heat generating heater for a cigarette-type electronic cigarette device according to one embodiment of the present invention.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

Figure 10:
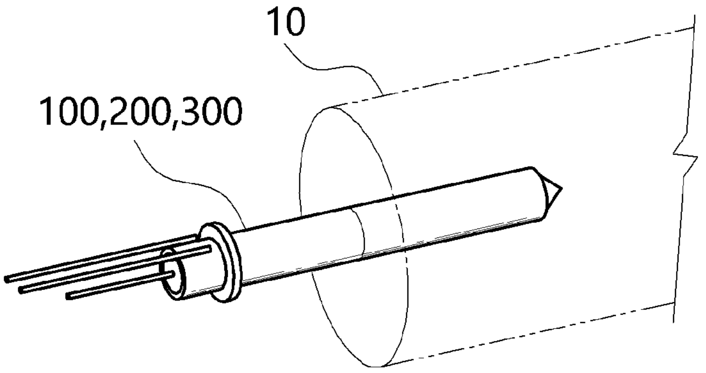
FIG. 10 is a view illustrating a usage state of the heat generating heater for a cigarette-type electronic cigarette device according to one embodiment of the present invention.

As shown in FIG. 10, a heat generating heater 100, 200, or 300 for a cigarette-type electronic cigarette device according to one embodiment of the present invention may be installed at an insertion port 20 of a cigarette-type electronic cigarette device and may receive power from a battery embedded in the cigarette-type electronic cigarette device. Here, a cigarette 10 may be inserted into the insertion port 20 and may receive heat from the heat generating heater 100, 200, or 300 for a cigarette-type electronic cigarette device.

Accordingly, the heat generating heater 100 for a cigarette-type electronic cigarette device according to one embodiment of the present invention may generate the heat to heat the cigarette 10 which is inserted into the insertion port 20, and steam for smoking may be generated from the cigarette 10 when power is applied while the cigarette 10 is inserted into the insertion port 20. Accordingly, a user may smoke by inhaling the steam generated from the cigarette 10.

In this case, the heat generating heater 100, 200, or 300 for a cigarette-type electronic cigarette device according to one embodiment of the present invention may have one end portion formed to be easily embedded in the cigarette 10 and may include a temperature sensing unit 130 or 230 which measures a heating temperature of the heat generating heater 100, 200, or 300.

Figure 5:
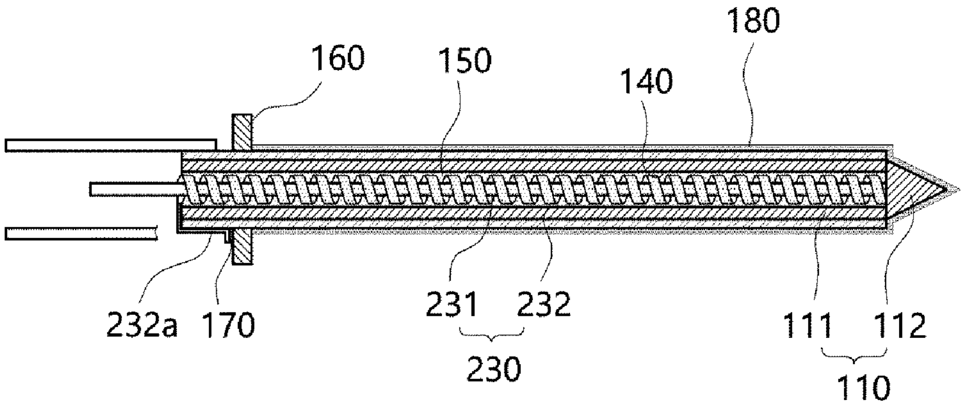
FIG. 5 is a cross-sectional view taken along line B-B in FIG. 3.
Figure 6:
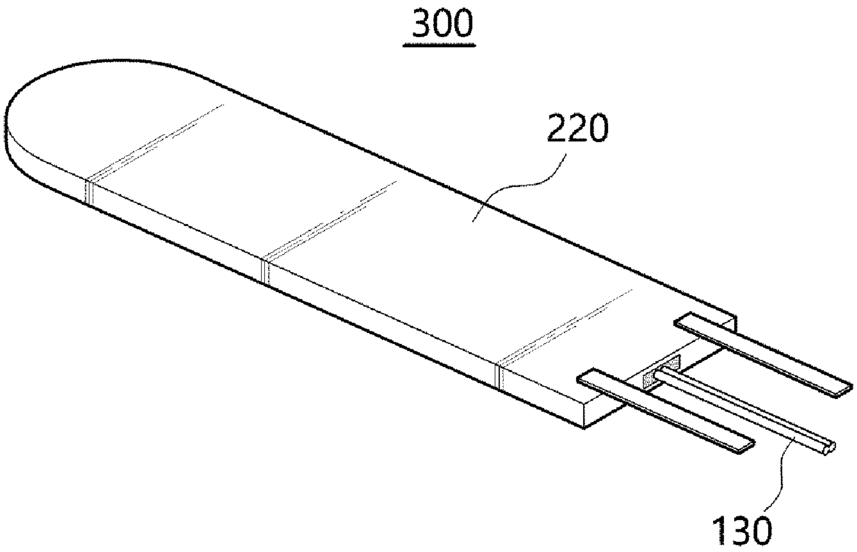
FIG. 6 is a view illustrating a heat generating heater for a cigarette-type electronic cigarette device according to still another embodiment of the present invention.
Figure 7:
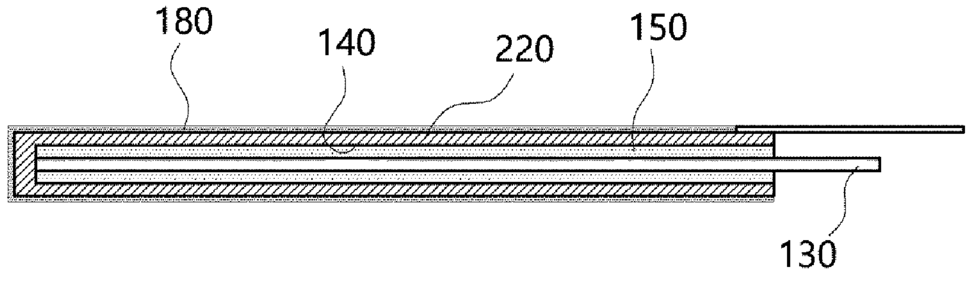
FIG. 7 is a cross-sectional view taken along line C-C in FIG. 6.

For example, the heat generating heater 100 or 200 for a cigarette-type electronic cigarette device may be implemented in a needle shape having a predetermined length as shown in FIGS. 1 to 5 or may be implemented in a plate shape as shown in FIGS. 6 and 7.

As a specific example, as shown in FIGS. 1 to 5, the heat generating heater 100 or 200 for a cigarette-type electronic cigarette device may include a main body 110 and a heat generating unit 120 or 220.

In this case, one end portion of the main body 110 may be formed in a pointed needle shape to easily penetrable into the cigarette 10, and the heat generating unit 120 may be disposed to surround a circumferential surface of the main body 110.

Accordingly, the heat generating heater 100 or 200 for a cigarette-type electronic cigarette device may heat the inside of the cigarette 10 by providing the heat through the portion embedded in the cigarette 10, and the cigarette 10 may generate the steam for smoking using the heat provided from the heat generating heater 100 or 200 for a cigarette-type electronic cigarette device.

Here, the main body 110 may include a rod portion 111 having a predetermined length to be capable of supporting the heat generating unit 120, and a tip portion 112 formed to be pointed on an end portion of the rod portion 111 to be easily penetrable into the cigarette 10.

In this case, the main body 110 may be formed of a ceramic material. For example, the main body 110 may be a ceramic material such as alumina, $ZrO_2$, MgO, $Si_3N_4$, SiC, AlN, ZTA, or the like but is not limited thereto, and all known ceramic materials may be applied.

Accordingly, the main body 110 may rapidly diffuse the heat generated from the heat generating unit 120 and may increase reliability and a life cycle of a product even in an operating condition in which temperature increase and cooling are repeatedly performed.

In this case, the heat generating unit 120 may be disposed to surround an outer surface of the main body 110. For example, the heat generating unit 120 may be disposed to surround a circumference of the rod portion 111 of the main body 110. Accordingly, the heat generated through the heat generating unit 120 when power is applied may move to the main body 110.

As another example, as shown in FIGS. 6 and 7, in the heat generating heater 300 for a cigarette-type electronic cigarette device, the heat generating unit 220 may be implemented in a plate shape.

In this case, the heat generating unit 220 may have one end portion which is formed to be pointed.

That is, since the heat generating heater 300 for a cigarette-type electronic cigarette device of the embodiment may have the heat generating unit 220 implemented in a plate shape unlike the heat generating heater 100 or 200 for a cigarette-type electronic cigarette device in the above-described embodiment, the above-described main body 110 may be omitted.

Further, in the heat generating heater 100 or 200 for a cigarette-type electronic cigarette device in the above-described embodiment, a shape in which the heat generating unit 120 surrounds a circumference of the main body 110 is described, but the shape is not limited thereto, and the heat generating heater 100 or 200 for a cigarette-type electronic cigarette device shown in FIGS. 1 to 5 may be composed of only the needle-shaped heat generating unit 120 excluding the main body 110 like the heat generating heater 300 for a cigarette-type electronic cigarette device shown in FIGS. 6 and 7.

In this case, one end portion of the heat generating unit 120 may be formed to be pointed to be easily embedded in the cigarette 10 like the heat generating unit 220 of the heat generating heater 300 for a cigarette-type electronic cigarette device shown in FIGS. 6 and 7.

The heat generating unit 120 or 220 may serve as a heating source which generates heat when power is applied.

Figure 8:
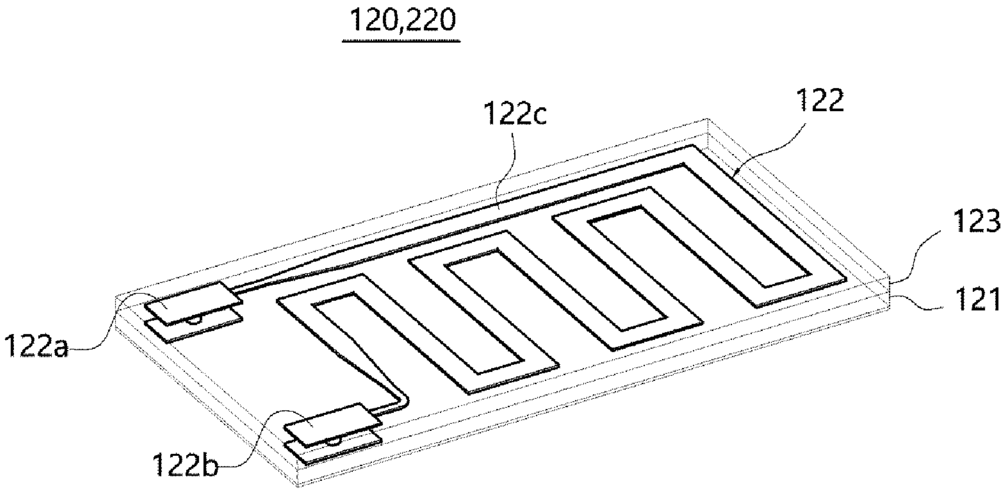
FIG. 8 is a view schematically illustrating detailed configurations of a heat generating unit applicable to the heat generating heater for a cigarette-type electronic cigarette device according to one embodiment of the present invention.

To this end, as shown in FIG. 8, the heat generating unit 120 or 220 may include a support 121, a heater pattern 122, and a cover layer 123.

Specifically, the support 121 may be formed of a ceramic material having heat resistance to withstand a high temperature of 100° C. or more when the heater pattern 122 generates heat. As an unlimited example, the support 121 may be a ceramic material such as alumina, $ZrO_2$, MgO, $Si_3N_4$, SiC, AlN, ZTA, or the like but is not limited thereto, and all known ceramic materials may be applied.

Further, the heater pattern 122 and the cover layer 123 may be disposed on one surface of the support 121. To this end, in the heat generating heater 100 or 200 for a cigarette-type electronic cigarette device according to one embodiment of the present invention, the heater pattern 122 and the cover layer 123 may be sequentially formed on one surface of the support 121 having a predetermined area.

Accordingly, in the heat generating heater 100, 200, or 300 for a cigarette-type electronic cigarette device according to one embodiment of the present invention, the heat generated from the heater pattern 122 when power is applied may move to the main body 110 through the support 121.

Accordingly, in the heat generating heater 100, 200, or 300, a heating area may be increased and uniform heating may be performed as a whole. Further, in the heat generating heater 100, 200, or 300, since the support 121 and the main body 110 are formed of a ceramic material, it is possible to increase the reliability and the life cycle of the product even in the operating condition in which the temperature increase and the cooling are repeatedly performed.

Meanwhile, as shown in FIGS. 1 to 5, in a case in which the heat generating heater 100 or 200 for a cigarette-type electronic cigarette device is implemented in the needle shape, the support 121 may be a sintered ceramic green sheet, and the heater pattern 122 and the cover layer 123 mat be sequentially formed on one surface of a ceramic green sheet in a state in which the support 121 is the ceramic green sheet.

Accordingly, in the heat generating heater 100 or 200 for a cigarette-type electronic cigarette device, since the support 121 may be wound along a circumferential direction of the rod portion 111 of the main body 110 in a state of the ceramic green sheet before sintering, the heat generating unit 120 may be disposed to surround the rod portion 111 of the main body 110.

Accordingly, in the heat generating heater 100 or 200 for a cigarette-type electronic cigarette device, the work of disposing the heat generating unit 120 to surround the rod portion 111 may be very easily performed, and the heat generating unit 120 may be integrated with the main body 110 after sintering.

The heater pattern 122 may serve as a heating element which generates heat when power is applied. As described above, the heater pattern 122 may be patterned on one surface of the support 121.

In this case, the heater pattern 122 may be a printed pattern formed through a conductive paste and may be formed through etching of a conductive member in a state in which the conductive member is attached to one surface of the support 121. Further, the heater pattern 122 may be formed by attaching a conductive member, which is formed in a predetermined pattern through shape processing such as punching, to one surface of the support 121.

As an unlimited example, the conductive paste and/or the conductive member may be any one selected from Au, Pt, Ag, tungsten, molybdenum, and manganese, or a combined ingredient of one or more of the above. However, a material of the conductive paste is not limited thereto, and it should be noted that all known electrode materials, which are appropriately selected to realize a heating temperature required when power is applied, among commonly used electrode materials may be used.

As described above, the heater pattern 122 may be formed in one surface of the support 121, and may be formed on a non-sintered support 121 of a ceramic green sheet.

Further, the heater pattern 122 may have two terminals **122*a* and 122*b* respectively formed on both end portions for electrical connection with other components (for example, a main board), and a pattern portion 122*c* having a predetermined length may connect the two terminals 122*a* and 122*b***.

In this case, the pattern portion **122*c* may be bent in a zigzag manner to be uniformly disposed with respect to an entire area of the ceramic green sheet. Accordingly, the heat generating heater 100, 200, or 300 for a cigarette-type electronic cigarette device may generate heat with respect to an entire area of the support 121 through the pattern portion 122*c*** and thus may be implemented as a surface type heater.

However, the shape of the heater pattern 122 is not limited thereto, and the shape of the pattern portion **122*c*** may be appropriately changed according to design conditions.

Further, the heater pattern 122 may be formed in a series or parallel manner and may also be formed in a shape in which the series manner and the parallel manner are mixed.

The cover layer 123 may be formed on one surface of the support 121 to cover the pattern portion **122*c* of the heater pattern 122. Accordingly, the cover layer 123 may prevent exposure of the pattern portion 122*c*** to the outside.

In this case, the cover layer 123 may be formed of a material having an insulating property so that a short circuit between the heater pattern 122 and the other component may be prevented. Further, the cover layer 123 may be formed of a material having heat resistance and thermosetting properties to be prevented from destruction by the heat generated from the heater pattern 122.

For example, the cover layer 123 may be formed of a resin having an insulating property, a thermosetting property, and heat resistance and may be a coating layer coated on one surface of the support 121 by a predetermined thickness.

As a specific example, the cover layer 123 may be a coating layer formed of liquid polyimide or polyamideimide but is not limited thereto, and all known materials having an insulating property, a thermosetting property, and heat resistance may be used.

Figure 2:
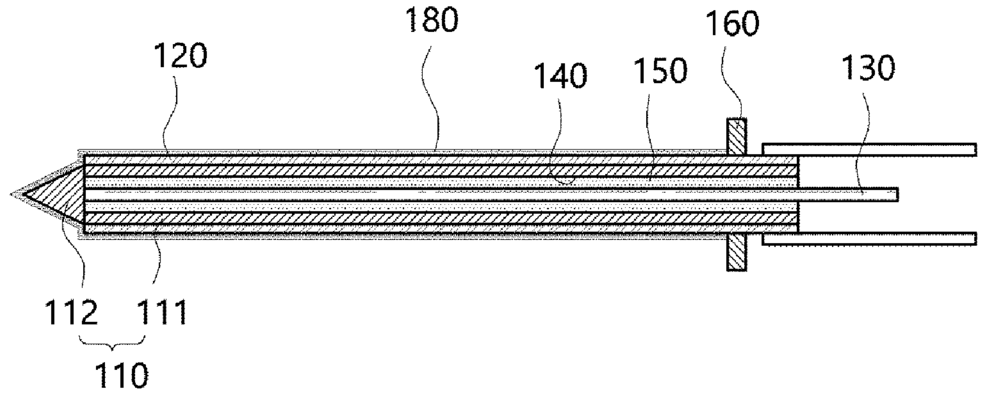
FIG. 2 is a cross-sectional view taken along line A-A in FIG. 1.
Figure 3:
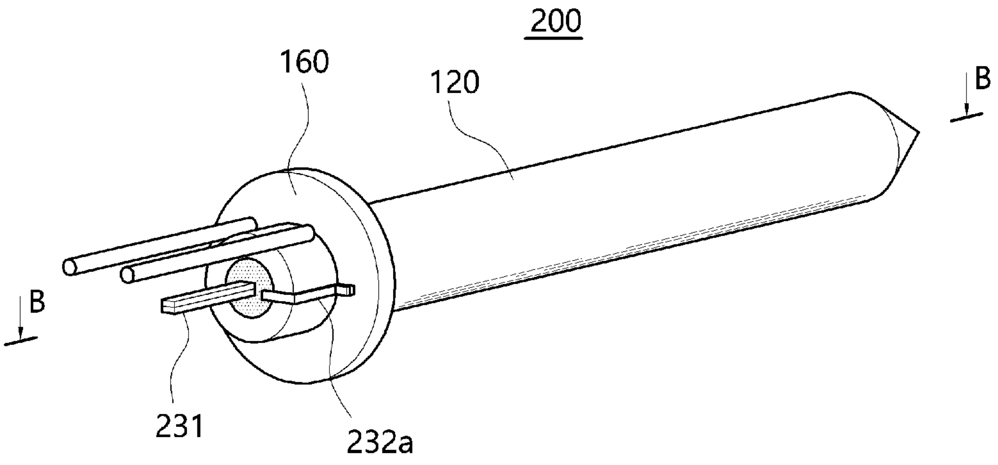
FIG. 3 is a view illustrating a heat generating heater for a cigarette-type electronic cigarette device according to another embodiment of the present invention.
Figure 4:
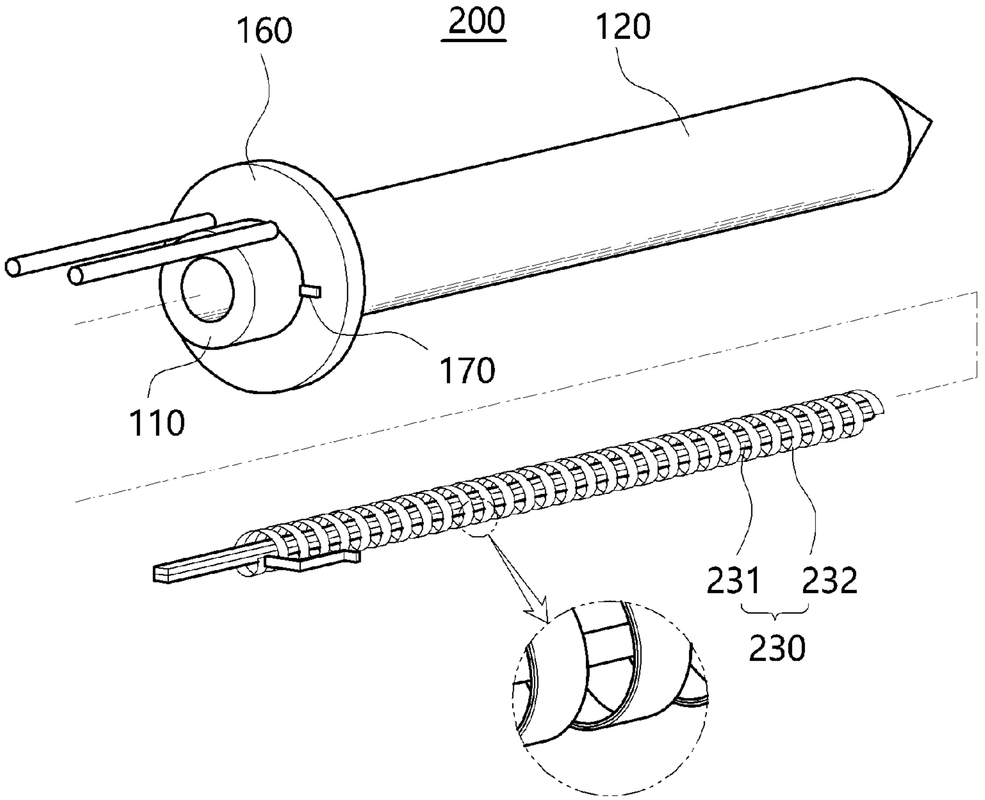
FIG. 4 is a view illustrating a state in which a temperature sensing unit is separated in FIG. 3.

Meanwhile, as shown in FIGS. 2, 5, and 7, the heat generating heater 100, 200, or 300 for a cigarette-type electronic cigarette device according to one embodiment of the present invention may include the temperature sensing unit 130 or 230 which measures a heating temperature of the heat generating unit 120 or 220.

The above-described temperature sensing unit 130 or 230 may be disposed to be embedded in the heat generating heater 100, 200, or 300 along a longitudinal direction of the heat generating heater 100, 200, or 300.

To this end, an arrangement hole 140 may be formed in the heat generating heater 100, 200, or 300 to dispose the temperature sensing unit 130 or 230 along the longitudinal direction of the heat generating heater 100, 200, or 300.

For example, in a case in which the heat generating heater 100 or 200 includes the main body 110, as shown in FIGS. 2 and 5, the rod portion 111 of the main body 110 excluding the tip portion 112 may be formed in a hollow shape. In this case, the hollow portion of the rod portion 111 may serve as the arrangement hole 140.

Alternatively, in a case in which the heat generating heater 300 is implemented as the plate-shaped heat generating unit 220, as shown in FIG. 7, the arrangement hole 140 may be formed inside the heat generating unit 220 along a longitudinal direction thereof.

Figure 9:
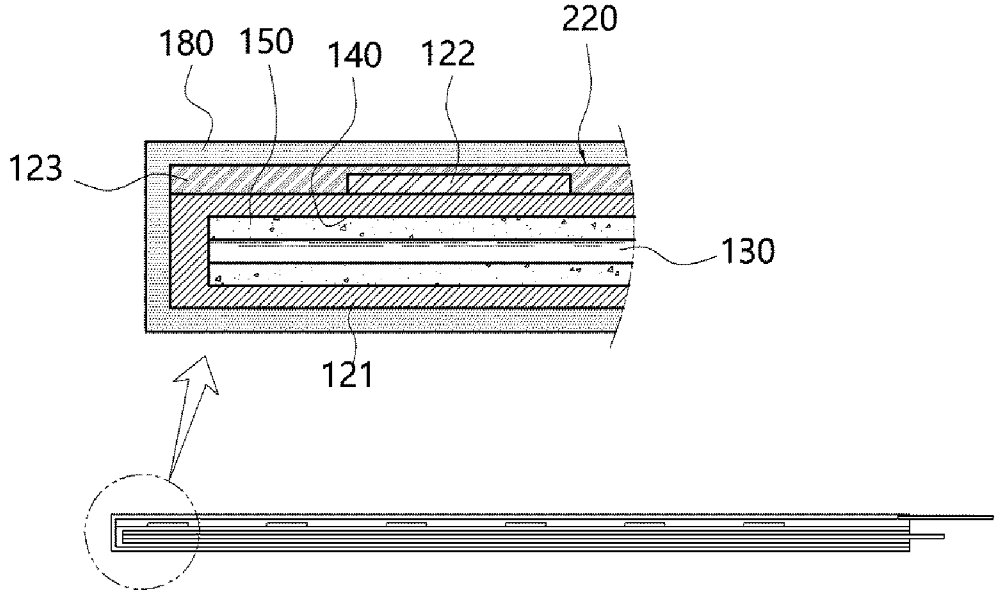
FIG. 9 is a view specifically illustrating the detailed configurations of the heat generating unit in FIG. 7.

In this case, as shown in FIG. 9, the arrangement hole 140 may be formed inside the support 221 constituting the heat generating unit 220 in the longitudinal direction.

Accordingly, the temperature sensing unit 130 or 230 may be inserted into the arrangement hole 140 to be disposed in the inside of the heat generating heater 100, 200, or 300 along the longitudinal direction, and may be measured the heating temperature of the heat generating unit 120 or 220.

Accordingly, the heat generating heater 100, 200, or 300 for a cigarette-type electronic cigarette device according to one embodiment of the present invention may uniformly control the heating temperature of the heat generating unit 120 or 220 by supplying or blocking the power on the basis of information of the heating temperature measured in the temperature sensing unit 130 or 230.

For example, the heat generating heater 100, 200, or 300 for a cigarette-type electronic cigarette device according to one embodiment of the present invention may uniformly maintain the heating temperature of the heat generating unit 120 or 220 at 280° C., but the heating temperature of the heat generating unit 120 or 220 is not limited thereto, and the heating temperature of the heat generating unit 120 or 220 may be appropriately adjusted according to design conditions.

As a specific example, as shown in FIGS. 2 and 7, the temperature sensing unit 130 may be a thermocouple. In this case, the thermocouple may be inserted into the arrangement hole 140 so that one end is located at a sealed end portion of the arrangement hole 140, and the other end may be connected to an external main board (not shown)

Further, the arrangement hole 140 may be filled with a filling material 150 having thermal conductivity therein, and the filling material 150 may fix a position of the thermocouple inserted into the arrangement hole 140.

For example, the filling material 150 may be a heat conductive adhesive including ceramic or glass. However, the filling material 150 is not limited thereto, and all materials capable of fixing the thermocouple and having thermal conductivity may be used without limitation.

Accordingly, in the heat generating heater 100 or 300 for a cigarette-type electronic cigarette device according to one embodiment of the present invention, since the power is supplied to or blocked from the heat generating unit 120 or 220 through control of a circuit part provided on the main board, the heat generating unit 120 or 220 may be heated to a uniform temperature.

That is, the circuit part may control the heating temperature of the heat generating unit 120 or 220 by blocking or allowing the power supplied to the heat generating unit 120 or 220 on the basis of the temperature measured in the thermocouple.

Here, all known thermocouples such as J type, K type, and the like may be applied to the thermocouple.

Alternatively, as shown in FIG. 5, the temperature sensing unit 230 may be a spiral bimetal. Here, the spiral bimetal may include a stem portion 231 having a predetermined length and a wound portion 232 surrounding the stem portion 231 from an end portion of the stem portion 231. In this case, both the stem portion 231 and the wound portion 232 may be formed of a bimetal. Accordingly, in the spiral bimetal, both the stem portion 231 and the wound portion 232 may measure the heating temperature of the heat generating unit 120.

In this case, the temperature sensing unit 230 may include an extending portion 232*a* extending from an end portion of the wound portion 232 and protruding to the outside of the arrangement hole 140 by a predetermined length, and the extending portion 232*a* may be bent in one direction or return to an original state through expansion and contraction according to a temperature of each of the stem portion 231 and the wound portion 232 disposed in the arrangement hole 140.

Accordingly, the extending portion 232*a* may come into contact with or not come into contact with a contact terminal 170 formed on an outer surface of the heat generating heater 200 for a cigarette-type electronic cigarette device. Here, the contact terminal 170 may be electrically connected to an external main board and may be formed on an outer surface of a stopper 160 which is described below. However, it should be noted that a position of the contact terminal 170 is not limited thereto, and the contact terminal 170 may be formed at an appropriate position according to design conditions.

Accordingly, the extending portion 232*a* may serve as a switch by maintaining a contact state with the contact terminal 170 or releasing the contact state according to the temperature of the heat generating unit 120.

As an unlimited example, in the heat generating heater 200 for a cigarette-type electronic cigarette device according to one embodiment of the present invention, when the temperature of the heat generating unit 120 measured by the wound portion 232 and the stem portion 231 is smaller than or equal to a set temperature, the extending portion 232*a* may be come into contact with the contact terminal 170, thereby allowing power supply to the heat generating unit 120.

Further, in the heat generating heater 200 for a cigarette-type electronic cigarette device according to one embodiment of the present invention, when the temperature of the heat generating unit 120 measured by the wound portion 232 and the stem portion 231 is greater than or equal to the set temperature, the extending portion 232*a* may be separated from the contact terminal 170 to maintain a non-contact state, thereby blocking the power supply to the heat generating unit 120. Accordingly, the heating temperature of the heat generating unit 120 may be uniformly maintained.

In this case, the arrangement hole 140 may be filled with the filling material 150 having thermal conductivity therein, and the filling material 150 may fix a position of the spiral bimetal inserted into the arrangement hole 140.

For example, the filling material 150 may be a heat conductive adhesive including ceramic or glass. However, the filling material 150 is not limited thereto, and all materials capable of fixing the spiral bimetal and having thermal conductivity may be used without limitation.

Meanwhile, in the drawings, a case in which the spiral bimetal is applied to the needle-shaped heat generating heater 200 for a cigarette-type electronic cigarette device is shown but is not limited thereto, and the spiral bimetal may also be applied to the plate-shaped heat generating heater 300 for a cigarette-type electronic cigarette device shown in FIGS. 6 and 7.

As described above, in the heat generating heater 100, 200, or 300 for a cigarette-type electronic cigarette device according to one embodiment of the present invention, the temperature sensing unit 130 or 230 which measures the heating temperature of the heat generating unit 120 or 220 may be provided as the thermocouple or the spiral bimetal to be embedded in in the heat generating heater 100, 200, or 300 along the longitudinal direction. Accordingly, the temperature sensing unit 130 or 230 may directly sense the heating temperature of the heat generating unit 120 or 220.

Accordingly, in the heat generating heater 100, 200, or 300 for a cigarette-type electronic cigarette device according to one embodiment of the present invention, the heating temperature of the heat generating unit 120 or 220 may be accurately measured through the temperature sensing unit 130 or 230, and the heat generating unit 120 or 220 may be controlled to be heated by the uniform temperature on the basis of the heating temperature measured from the temperature sensing unit 130 or 230.

Meanwhile, in the heat generating heater 100, 200, or 300 for a cigarette-type electronic cigarette device according to one embodiment of the present invention, a heat dissipation coating layer 180 may be formed so that heat emissivity in heating of the heat generating unit 120 or 220 may be increased. The above-described heat dissipation coating layer 180 may be formed on an exposed surface of the heat generating unit 120 or 220 exposed to the outside.

Accordingly, since the heat generated from the heat generating unit 120 or 220 when power is applied may be smoothly transferred to an entire area of the heat generating heater 100, 200, or 300 through the heat dissipation coating layer 180, the heating area may be maximized.

For example, the heat dissipation coating layer 180 may be a coating layer including a heat dissipating filler, and the heat dissipation coating layer 180 may be a ceramic nano-coating layer. Here, the heat dissipating filler may be a filler having a heat dissipation property and thermal conductivity. As an unlimited example, the heat dissipation coating layer may be a mixture of a carbon-based filler such as graphite, a carbon nano tube (CNT), or the like, and a ceramic filler such as AlN, BN, MgO, alumina, or the like.

The above-described heat dissipation coating layer 180 may improve deviation in temperature between a direct upper region and other regions of the heater pattern 122 through the heat dissipating filler and may improve the heat dissipation property through the heat dissipation coating layer 180.

Accordingly, in the heat generating heater 100, 200, or 300 for a cigarette-type electronic cigarette device according to the embodiment, uniform heating or temperature increase may be performed in the entire area, and the temperature may be increased to a higher temperature in a short time.

Meanwhile, the heat generating heater 100 or 200 for a cigarette-type electronic cigarette device may further include the stopper 160 protruding outward along a circumferential direction, on the one end portion. The above-described stopper 160 may serve as a coupling port or fixing port for coupling with the cigarette-type electronic cigarette device in a process of mounting the heat generating heater 100 or 200 for a cigarette-type electronic cigarette device on the cigarette-type electronic cigarette device.

For example, the stopper 160 may have a ring shape having a through port formed in a center portion, and one end portion of the heat generating heater 100 or 200 may be fixed by an adhesion layer after being inserted into the through port.

In this case, the stopper 160 may be disposed to surround a circumferential surface of the heat generating heater 200 at positions excluding portions where the two terminals 122*a* and 122*b* are formed.

That is, with respect to FIG. 2, the pattern portion 122*c* may be disposed to be located at a left side of the stopper 160, and the two terminals 122*a* and 122*b* may be disposed to be located at a right side of the stopper 160.

Accordingly, in the heat generating heater according to the embodiment, a heating region where the cigarette 10 is heated may be configured by a portion of a length disposed at the left side of the stopper 160 among an entire length of the rod portion 111.

Here, the stopper 160 may be formed of a ceramic material such as alumina, $ZrO_2$, MgO, $Si_3N_4$, SiC, AlN, ZTA, or the like to increase reliability and increase the life cycle of the product even in an operating condition in which temperature increase and cooling are repeatedly performed.

Meanwhile, in the above-described descriptions and drawings, although a case in which the arrangement hole 140 is formed inside the heat generating heater 100, 200, or 300 and then the temperature sensing unit 130 or 230 is disposed in the arrangement hole 140 to uniformly realize the heating temperature of the heat generating unit 120 or 220 is shown and described, the present invention is not limited thereto, and the heating temperature of the heat generating unit 120 or 220 may also be uniformly realized in other manners.

For example, a uniform heating temperature may be realized by appropriately determining the type of the support 121 constituting the heat generating unit 120 or 220, the material of the heater pattern 122, and the entire heating area of the heat generating heater. Further, a material of an electrode used to form the heater pattern, a content ratio of a composition used as the material of the electrode, design of a resistance wire of the heater pattern, and the like may be appropriately considered for the material of the heater pattern 122.

Although embodiments of the present invention have been described above, the spirit of the present invention is not limited to the embodiments shown in the description, and although those skilled in the art may provide other embodiments through the addition, change, or removal of the components within the scope of the same spirit of the present invention, and such embodiments are also included in the scope of the spirit of the present invention.

The invention claimed is:

1. A heat generating heater for a cigarette-type electronic cigarette device having at least a portion of a length thereof inserted into a cigarette, the heat generating heater comprising:

a main body formed of a ceramic material and having one end portion that is pointed so as to penetrate into the cigarette;

a heat generating unit disposed to surround a circumferential surface of the main body to generate heat so that the inside of the cigarette is heated;

an arrangement hole formed inside the main body along a longitudinal direction thereof; and a temperature sensing unit disposed in the arrangement hole to measure a heating temperature of the heat generating unit, the temperature sensing unit including: a spiral bimetal, wherein the spiral bimetal includes a stem portion having a predetermined length, a wound portion wound many times along a longitudinal direction of the stem portion from an end portion of the stem portion, and an extending portion extending from an end portion of the wound portion to protrude to the outside of the arrangement hole by a predetermined length, and wherein the extending portion is come into contact with or not come into contact with a contact terminal formed in an outer surface of the heat generating heater for a cigarette-type electronic cigarette device by being bent in one direction or return to an original according to a temperature of the heat generating unit.

2. The heat generating heater of claim 1, wherein:

the main body includes a hollow-shaped rod portion in which the arrangement hole is formed and a tip portion sharply formed at one end portion of the rod portion; and the heat generating unit is disposed to surround the rod portion in a circumferential direction of the rod portion.

3. The heat generating heater of claim 1, further comprising a filling material having thermal conductivity and filled inside the arrangement hole, wherein the filling material fixes a position of the temperature sensing unit inserted into the arrangement hole.

4. The heat generating heater of claim 1, wherein the heat generating unit includes a support formed of a ceramic material, a heater pattern patterned in one surface of the support so that heat is generated to heat the inside of the cigarette, and a cover layer which has an insulating property and covers the heater pattern.

5. The heat generating heater of claim 4 wherein the support of the heat generating unit is sintered after rolling to surround the circumferential surface of the main body in a ceramic green sheet state.

* * * * *